F. H. HALSTEAD.
LATHE TOOL.
APPLICATION FILED NOV. 7, 1916.

1,299,712. Patented Apr. 8, 1919.

Inventor:
Frederick Henry Halstead,
by Emery, Booth, Janney & Varney,
Attys.

UNITED STATES PATENT OFFICE.

FREDERICK HENRY HALSTEAD, OF WORCESTER, MASSACHUSETTS, ASSIGNOR TO RIVETT LATHE AND GRINDER COMPANY, OF FANEUIL, MASSACHUSETTS, A CORPORATION OF MASSACHUSETTS.

LATHE-TOOL.

1,299,712.

Specification of Letters Patent. Patented Apr. 8, 1919.

Application filed November 7, 1916. Serial No. 130,063.

*To all whom it may concern:*

Be it known that I, FREDERICK HENRY HALSTEAD, a citizen of the United States, and a resident of Worcester, county of Worcester, and State of Massachusetts, have invented an Improvement in Lathe-Tools, of which the following description, in connection with the accompanying drawings, is a specification, like characters on the drawings representing like parts.

This invention pertains to improvements in metal working apparatus and more particularly, though not exclusively, to thread cutting tools and apparatus for presenting such tools to the work. The type of tool to which my invention is particularly applicable is that disclosed in the patent to Herman Dock, No. 632,678, and in the patent to Edward Rivett, No. 652,643, wherein a cutter disk is used which has a plurality of cutting points, which increase progressively in length and which are adapted to be progressively presented to the work, to cut screw threads and the like. Among the objects of my invention are to provide a more simple tool holder, providing greater rigidity of parts, greater facility of setting up and adjustment, and improved operation.

The drawings show a preferred construction of one illustrative embodiment of my invention.

Figure 1:
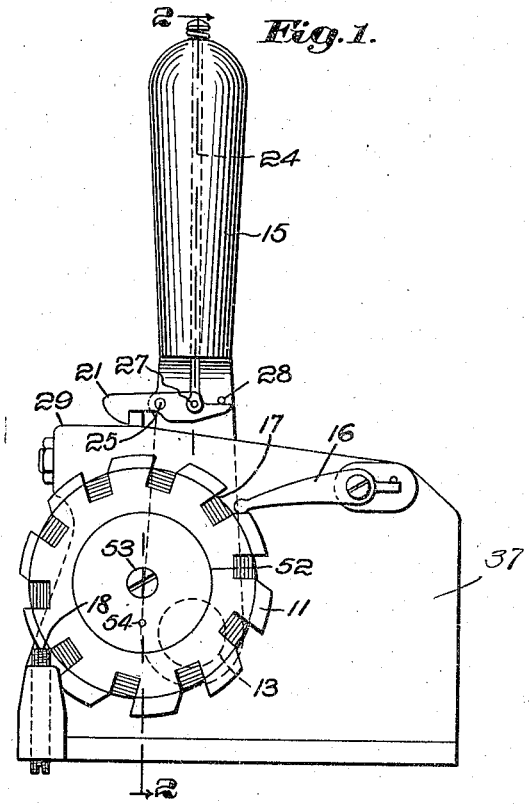
Figure 1 is a side elevation showing the cutter and its improved holder.

In the illustrative embodiment of my invention shown in the drawings, I provide a cutter disk 11, having a plurality of cutter points, herein shown as ten, which cutting points are of progressively increasing length, and in the general type shown in patent to Dock, 632,678. These cutting points are adapted to be progressively presented to the work by the following mechanism:

I prefer that the cutter disk 11 be centrically bored and mounted for rotative movement about a boss 12, which is mounted on but eccentric to an oscillatory element 13, mounted in a bearing 14 in the stock or body portion of the tool holder. Coöperating with the above to produce the desired step by step rotation of the cutter 11, I preferably provide a pawl 16, adapted to engage the surfaces 17 of the cutter disk 11, as the axis of the latter is moved through an arc about the axis of the oscillatory element 13 by manual movement of the lever 15. To properly position each cutting point, I provide a support 18, herein shown as a set screw, to successively engage the heels of the cutting points.

The operation of the before described mechanism is substantially identical with the operation described in my copending application, Serial No. 123,576, filed Oct. 2, 1916.

In tools of this class, it has heretofore been customary to adjust the depth of cut by mechanism, providing for a bodily shifting of the axis of the cutter turning element. I have shown improved means for such adjustment, utilizing a regulation of the forward stroke of the lever 15, in combination with an adjustment for adjustably varying the location of the means for holding the tool up to the work. To this end, I preferably provide, as shown, the catch means typified by the pawl 21 pivoted at 22 to the lever 15, and adapted to engage an adjustable pawl locking means 23, by pressure of the spring acting on a rod 24, pivoted at 27 to the pawl 21, which preferably is held against excessive spring actuated movement by the stop 28. The operator may disengage the pawl 21 from the pawl locking means 23, by pressure of his thumb on the top of the rod 24.

The preferred fine adjustment referred to may include, as shown, the pawl engaging element 23, having a threaded shank 29, engaging an interiorly threaded boss 30 on the tool stock and provided with a thumb screw 31 to prevent undesired turning movement. Coöperating with the pawl engaging element 21, I preferably provide an abutment 32, to determine the limit of forward movement of the lever 15. The abutment 32 is preferably carried by the pawl engaging element 23 and may be, as shown, threaded in the shank 29 and adjustable relative thereto. Therefore, adjustment of the pawl engaging element 32 necessarily automatically effects corresponding adjustment of the abutment 32, thereby preventing lost motion. If lost motion arises on account of wear, or if lost motion or binding arise from too great an adjustment of the pawl engaging element 23, such lost motion or binding can be adjusted by adjustment of the abutment 32, relative to the element 23.

It will be noted that the before described adjustments are all independent of any shifting of the axis of the lever 15 or the coöperating parts which actuate turning of the cutter disk 11, thereby greatly simplifying the tool and cheapening its construction.

The tool illustrated is provided with improved means for securing it to the tool carriage of the lathe and improved means for tipping the cutter 11 and associated parts to secure the desired rake.

I preferably accomplish this by providing a base portion 33, which can be secured to the tool carriage 34, by a screw 35 and nut 36, independently of the tool stock 37, and by providing the base portion 33 with beads 38 and 39, adapted to be engaged respectively by a lip 40 on the tool stock 37 and a lip 41 on a clamp 42, having a slot 43, through which a clamping screw 44 enters a threaded hole 45 in the tool stock 37. An adjusting screw 46 passes through a threaded hole in the tool stock 37 and abuts against the base portion 33.

The inclination of the tool may, therefore, be changed, by slackening off on the clamping screw 44, turning the adjusting screw 46 until the desired inclination of the tool is secured, and then tightening the clamping screw 44.

The before described arrangement provides independent means for adjusting the tool angularly to and from the work and from the means for adjusting the tool laterally on the tool carrier.

The independently attachable base portion permits the use of an attachment screw, which can be under the cutter disk operating mechanism and hence much closer to the work, providing greater rigidity and permitting the conjoint use of the tool and a steady rest or follower carried by the tool carriage, which conjoint use was precluded by the greater width of this class of tools as heretofore constructed.

Figure 2:
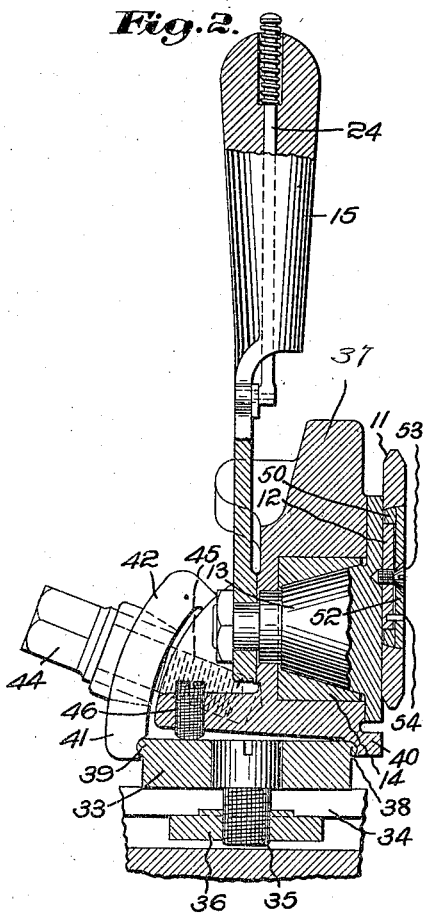
Fig. 2 is a vertical transverse section partly in elevation on the line 2—2 of Fig. 1.
Figure 3:
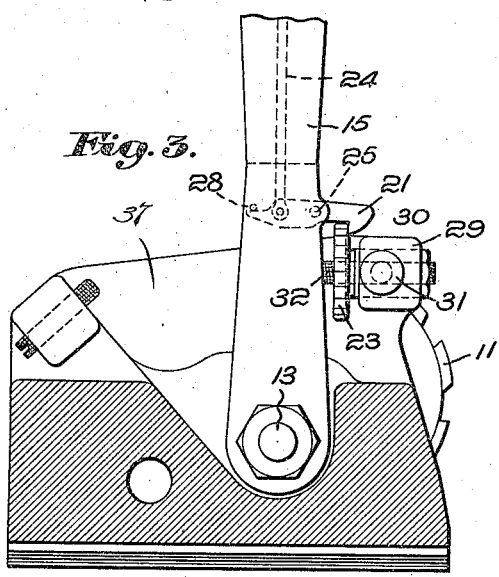
Fig. 3 is a side elevation partly in section showing the opposite side of the tool from that shown in Fig. 1.
Figure 4:
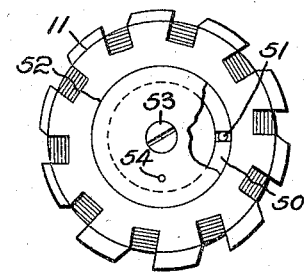
Fig. 4 is a side elevation partly broken away and showing the cutter disk and detail of the improved means for attachment thereof.

Referring again to Fig. 2, it will be noted that the bearing 14 and the oscillatory element 13, can be assembled with the tool stock 37 from one side, and that the opposite end of the aperture into which they are assembled, is a part of the tool stock 37, thereby rendering unnecessary the use of a separate closure plate, necessitating an aperture in the boss of the tool stock as has heretofore been used in this class of tool.

It is desirable that the cutter disk 11 present a slight resistance to rotation about its axis, and that the resistance be independent of the personal equation.

To this end, I have provided one form of expansive cutter engaging means typified by the split spring ring 50 adapted to fit between the cutter 11 and the boss 12, while held against rotation by the pin 51 and while held against displacement by the disk 52, which is preferably held in place by a screw 53 entering the boss 12, and which may be held against displacement by the pin 54, locking it relative to the boss 12.

The interior of the cutter disk is preferably ground to an arcuate taper, which greatly facilitates the assembly and disassembly of the cutter 11 and associated parts, which assembly and disassembly must be effected at each time the type of thread to be cut is changed, in order to substitute an appropriate cutter.

The tool illustrated presents many advantageous features which, while they may be of use separately, are of particular utility when used in combination with each other.

It will be understood, however, that my invention is not confined to the specific embodiment thereof illustrated and described, but that changes involving alteration, omission, substitution, rearrangement and reorganization of parts may be made without departing from the scope of my invention which is best defined in the following claims.

Claims:

1. As a new article of manufacture, a cutter disk for cutting threads having a plurality of cutting points, increasing progressively in length and having an annular central bore, presenting an interiorly disposed surface, arcuate in longitudinal cross section.

2. In a device of the class described, a cutter wheel, a tool stock, and resilient attachment means for rotatably securing said cutter wheel in operative relation to the tool stock, while frictionally opposing rotation of said cutter wheel.

3. In a device of the class described, having a cutter disk, a tool stock, and interposed cutter disk shifting mechanism for moving said cutter disk bodily to and from the work; attachment means for rotatably and removably securing said cutter disk in operative relation to said cutter disk shifting mechanism, said attachment means including an annular aperture axial of said cutter disk, a boss projecting from said cutter disk shifting mechanism, a split ring interposed between said boss and the interior surface of said cutter disk and a retaining element for holding said split ring and said cutter disk in operative relation, each to the other, and to said cutter disk shifting mechanism.

4. In a device of the class described, having a cutter disk, a tool stock, and interposed cutter disk shifting mechanism for moving said cutter disk bodily to and from the work; attachment means for rotatably and removably securing said cutter disk in operative relation to said cutter disk shifting mechanism, said attachment means including an annular aperture axial of said cutter disk, a boss, a split ring interposed between said boss and the interior surface of said cutter disk and a retaining element for holding said split ring and said cutter disk in operative relation, each to the other, and to said cutter disk shifting mechanism.

5. In a device of the class described, the combination of the cutter disk 11, the split ring 50 expansively frictionally engaging an axial aperture in said cutter disk and retaining means permitting removal of said ring and cutter disk from said boss.

6. In a device of the class described, the combination of a cutter disk and attachment means therefor frictionally opposing rotation of said cutter disk with predetermined frictional pressure, independent of adjustment by the operator.

7. In a device of the class described, a base, an aperture through said base, a bolt extending through said aperture for attaching said base to the tool carriage of a lathe, a stock or body portion carrying a cutter disk and attachment means for securing said stock or body portion on said base independently of said bolt.

8. In a device of the class described, a tool stock carrying a cutter disk, and cutter disk turning mechanism, a base for said tool stock, means for adjustably securing said tool stock to said base, and a bolt located below said cutter disk turning mechanism for securing said base to the carriage of a lathe independently of said means for securing said tool stock to said base.

9. In a device of the class described, the combination of a cutter disk; an oscillatory shaft eccentrically and rotatably carrying said cutter disk; a lever for oscillating said oscillatory shaft; cutter disk rotating means coöperating with said oscillatory shaft and said lever; means for varying the limit of forward movement of said cutter disk; and locking means for preventing undesired retractive movement of said cutter disk, said locking means being compensatory to compensate for variation of the limit of forward movement of said cutter disk.

10. In a device of the class described, the tool stock, the cutter disk carried thereby, the base having a pivotal bearing for said tool stock, the inclination adjusting screw 46 in said tool stock, and a clamp engaging the opposite side of said base and engaging said tool stock for retaining said stock in adjusted position relative to said base.

11. In a device of the class described, the base 33, the stock 37 carrying the cutter 11, the pivotal bearing 38, the inclination adjusting screw 46 and the slotted clamp 42 provided with the clamp screw 44 for holding said stock 37 in adjusted relation to said base 33.

12. In a device of the class described comprising, in combination, an oscillatory shaft, a cutter disk eccentrically and rotatably mounted thereon, a removable bearing for said oscillatory shaft, and a body portion having an aperture therein for receiving said removable bearing and providing an integral shoulder opposing longitudinal displacement of said bearing in one direction.

13. In a device of the class described, the combination of a cutter disk, cutter disk rotating means including a lever for shifting said cutter disk bodily, an adjustable abutment for determining the limit of forward movement of said cutter disk, and adjustable locking means for preventing undesired retractive movement of said cutter disk.

14. In a device of the class described, the combination of a cutter disk, a tool stock, cutter disk rotating means including an oscillatory support by which said cutter disk is rotatably and eccentrically carried, said oscillatory support having a fixed axis relative to said tool stock, and adjustment means for adjusting the operative position of said cutter disk relative to said tool stock and to and from the work while maintaining unchanged the relation of said axis to said tool stock.

15. In a device of the class described, the combination of a cutter disk; an oscillatory shaft eccentrically and rotatably carrying said cutter disk; a lever for oscillating said oscillatory shaft; cutter disk rotating means coöperating with said oscillatory shaft and said lever; means for varying the limit of forward movement of said cutter disk; locking means for preventing undesired retractive movement of said cutter disk, and a locking means controller carried by said lever.

16. In a device of the class described, the combination of the cutter disk 11, the lever 15 carrying the locking pawl 21 and the tool stock 37 carrying the adjustable pawl engaging element 21.

17. In a device of the class described, the combination of a cutter disk, means for rotating said cutter disk including a lever, a coöperating pawl, a pawl engaging element, means for adjustably determining the limit of forward movement of said lever, the last named means being carried by said pawl engaging element.

18. In a device of the class described, the combination of a cutter disk, a tool stock, means for rotating said cutter disk including a lever, a pawl carried by said lever, and a pawl engaging element adjustably carried by said tool stock.

19. In a device of the class described, the combination of a cutter disk, a tool stock, means for rotating said cutter disk including a lever, a pawl carried by said lever, an adjustable pawl engaging element carried by said tool stock and an abutment for said lever carried by and adjustable with said pawl engaging element.

20. In a device of the class described, the combination of a cutter disk, a tool stock, means for rotating said cutter disk including a lever, a pawl carried by said lever, an adjustable pawl engaging element carried by said tool stock and an abutment for said lever carried by, adjustable with and relative to said pawl engaging element.

In testimony whereof, I have signed my name to this specification.

FREDERICK HENRY HALSTEAD.

Copies of this patent may be obtained for five cents each, by addressing the "Commissioner of Patents, Washington, D. C."